US012783921B2

(12) United States Patent
Tian et al.

(10) Patent No.: US 12,783,921 B2
(45) Date of Patent: Nov. 3, 2026

(54) DISENTANGLED OUT-OF-DISTRIBUTION (OOD) CALIBRATION AND DATA DETECTION

(71) Applicant: Samsung Electronics Co., Ltd., Suwon-si (KR)

(72) Inventors: Junjiao Tian, Atlanta, GA (US); Yen-Chang Hsu, Fremont, CA (US); Yilin Shen, Santa Clara, CA (US); Hongxia Jin, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1051 days.

(21) Appl. No.: 17/931,449

(22) Filed: Sep. 12, 2022

(65) Prior Publication Data

US 2023/0107006 A1 Apr. 6, 2023

Related U.S. Application Data

(60) Provisional application No. 63/251,463, filed on Oct. 1, 2021.

(51) Int. Cl.
*G06N 7/01* (2023.01)

(52) U.S. Cl.
CPC .................................... *G06N 7/01* (2023.01)

(58) Field of Classification Search
None
See application file for complete search history.

(56) References Cited

U.S. PATENT DOCUMENTS

| | | | | |
|---|---|---|---|---|
| 9,235,562 | B1 * | 1/2016 | Hart | G06F 18/211 |
| 11,341,365 | B2 | 5/2022 | Park et al. | |
| 12,462,200 | B1 * | 11/2025 | Liu | G06N 20/20 |
| 2020/0160151 | A1 * | 5/2020 | Urtasun | G06F 18/214 |
| 2021/0035021 | A1 | 2/2021 | Sasson et al. | |
| 2021/0326756 | A1 * | 10/2021 | Khaleghi | G06N 3/08 |
| 2021/0365771 | A1 | 11/2021 | Speakman et al. | |
| 2022/0058437 | A1 * | 2/2022 | Soni | G06N 3/08 |
| 2022/0067449 | A1 * | 3/2022 | Perera | G06F 18/241 |

(Continued)

FOREIGN PATENT DOCUMENTS

| | | |
|---|---|---|
| CN | 112668655 A | 4/2021 |
| WO | 2022108912 A1 | 5/2022 |

OTHER PUBLICATIONS

Ioffe et al, "Batch Normalization: Accelerating Deep Network Training by Reducing Internal Covariate Shift", arXiv preprint arXiv:1502.03167 (2015). (Year: 2015).*

(Continued)

*Primary Examiner* — Viker A Lamardo
*Assistant Examiner* — Leah M Feitl

(57) ABSTRACT

A method includes providing, using at least one processing device of an electronic device, input data to a machine learning model. The method also includes extracting, using the at least one processing device, features of the input data. The method further includes performing, using the at least one processing device, a geometric transformation of the features, where the geometric transformation is based on first and second parametric instance-dependent scalar functions. In addition, the method includes producing, using the at least one processing device, a predictive probability distribution based on the transformed features.

20 Claims, 6 Drawing Sheets

(56) References Cited

U.S. PATENT DOCUMENTS

| | | | | |
|---|---|---|---|---|
| 2022/0188635 | A1 | 6/2022 | Qiu et al. | |
| 2022/0318557 | A1* | 10/2022 | Mohseni | G06V 20/56 |
| 2023/0394652 | A1* | 12/2023 | Pezzotti | G06T 7/0012 |

OTHER PUBLICATIONS

Techapanurak et al, "Hyperparameter-Free Out-of-Distribution Detection Using Softmax of Scaled Cosine Similarity", arXiv preprint arXiv:1905.10628 (2019). (Year: 2019).*
Yang et al. "Semantically Coherent Out-of-Distribution Detection." arXiv preprint arXiv:2108.11941 (Aug. 2021). (Year: 2021).*
Hsu et al., "Generalized ODIN: Detecting Out-of-distribution Image without Learning from Out-of-distribution Data," Computer Vision and Pattern Recognition, Mar. 2020, 14 pages.
Tian et al., "A Geometric Perspective towards Neural Calibration via Sensitivity Decomposition," 35th Conference on Neural Information Processing Systems, Nov. 2021, 17 pages.
Chan et al., "Unlabelled Data Improves Bayesian Uncertainty Calibration under Covariate Shift," Proceedings of the 37th International Conference on Machine Learning, 2020, 11 pages.
Fort et al., "Exploring the Limits of Out-of-Distribution Detection," 35th Conference on Neural Information Processing Systems, Nov. 2021, 14 pages.
Gneiting et al., "Strictly Proper Scoring Rules, Prediction, and Estimation," Journal of the American Statistical Association, Review Article, vol. 102, No. 477, Mar. 2007, 20 pages.
Gulrajani et al., "Improved Training of Wasserstein GANs," Machine Learning, Dec. 2017, 11 pages.
Guo et al., "On Calibration of Modern Neural Networks," ICML 2017, Aug. 2017, 14 pages.
Hendrycks et al., "Benchmarking Neural Network Robustness to Common Corruptions and Perturbations," ICLR 2019, Mar. 2019, 16 pages.
Hendrycks et al., "A Baseline for Detecting Misclassified and Out-of-Distribution Examples in Neural Networks," ICLR 2017, Oct. 2018, 12 pages.
Hendrycks et al., "Deep Anomaly Detection with Outlier Exposure," ICLR 2019, Jan. 2019, 18 pages.
Hochreiter et al., "Long Short-Term Memory," Neural Computation, vol. 9, Issue 8, Nov. 1997, 32 pages.
Jang et al., "Improving Classifier Confidence Using Lossy Label-Invariant Transformations," Proceedings of the 24th International Conference on Artificial Intelligence and Statistics, Nov. 2020, 14 pages.
Krizhevsky, "The CIFAR-10 dataset," Learning Multiple Layers of Features from Tiny Images, Apr. 2009, 4 pages.
Krizhevsky, "The CIFAR-100 dataset," Learning Multiple Layers of Features from Tiny Images, Apr. 8, 2009, 4 pages.
Kull, "Beyond temperature scaling: Obtaining well-calibrated multiclass probabilities with Dirichlet calibration," 33rd Conference on Neural Information Processing Systems, Oct. 2019, 27 pages.
Kumar et al., "Verified Uncertainty Calibration," 33rd Conference on Neural Information Processing Systems, Jan. 2020, 38 pages.
Kumar et al., "Trainable Calibration Measures for Neural Networks From Kernel Mean Embeddings," Proceedings of the 35th International Conference on Machine Learning, 2018, 10 pages.
Lakshminarayanan et al., "Simple and Scalable Predictive Uncertainty Estimation using Deep Ensembles," 31st Conference on Neural Information Processing Systems, Nov. 2017, 15 pages.
Lee et al., "A Simple Unified Framework for Detecting Out-of-Distribution Samples and Adversarial Attacks," 32nd Conference on Neural Information Processing Systems, Oct. 2018, 20 pages.
Liang et al., "Enhancing the Reliability of Out-of-Distribution Image Detection in Neural Networks," ICLR 2018, Aug. 2020, 15 pages.
Liu et al., "Simple and Principled Uncertainty Estimation with Deterministic Deep Learning via Distance Awareness," 34th Conference on Neural Information Processing Systems, Oct. 2020, 25 pages.
Liu et al., "Energy-based Out-of-distribution Detection," 34th Conference on Neural Information Processing Systems, Apr. 2021, 16 pages.
Liu, "Decoupled Networks," CVPR 2018, Apr. 2018, 13 pages.
Loshchilov et al., "SGDR: Stochastic Gradient Descent with Warm Restarts," ICLR 2017, Feb. 2017, 16 pages.
Miyato et al., "Spectral Normalization for Generative Adversarial Networks," ICLR 2018, Feb. 2018, 26 pages.
Moreno-Torres et al., "A unifying view on dataset shift in classification," Pattern Recognition 45, 2012, pp. 521-530.
Mukhoti et al., "Deterministic Neural Networks with Appropriate Inductive Biases Capture Epistemic and Aleatoric Uncertainty," Machine Learning, Feb. 2021, 20 pages.
Napoles et al., "Annotated Gigaword," Proceedings of the Joint Workshop on Automatic Knowledge Base Construction and Web-scale Knowledge Extraction, Jun. 2012, 6 pages.
Netzer et al., "Reading Digits in Natural Images with Unsupervised Feature Learning," NIPS Workshop on Deep Learning and Unsupervised Feature Learning, 2011, 9 pages.
Ovadia et al., "Can You Trust Your Model's Uncertainty? Evaluating Predictive Uncertainty Under Dataset Shift," Advances in Neural Information Processing Systems, Jun. 2019, 20 pages.
Pennington et al., "GloVe: Global Vectors for Word Representation," Proceedings of the 2014 Conference on Empirical Methods in Natural Language Processing, Oct. 2014, 12 pages.
Rahimi et al., "Intra Order-Preserving Functions for Calibration of Multi-Class Neural Networks," 34th Conference on Neural Information Processing Systems, Oct. 2020, 27 pages.
Roy et al., "Does Your Dermatology Classier Know What It Doesn't Know? Detecting the Long-Tail of Unseen Conditions," Apr. 2021, 19 pages.
Tack et al., "CSI: Novelty Detection via Contrastive Learning on Distributionally Shifted Instances," 34th Conference on Neural Information Processing Systems, Oct. 2020, 25 pages.
Thulasidasan et al., "On Mixup Training: Improved Calibration and Predictive Uncertainty for Deep Neural Networks," 33rd Conference on Neural Information Processing Systems, Jan. 2020, 15 pages.
Anonymous et al., "A Simple and Effective Baseline for Out-of-Distribution Detection Using an Abstention Class," ICLR 2021, Sep. 2020, 11 pages.
Van Amersfoort et al., "Uncertainty Estimation Using a Single Deep Deterministic Neural Network," Proceedings of the 37th International Conference on Machine Learning, Mar. 2020, 13 pages.
Vaswani et al., "Attention Is All You Need," 31st Conference on Neural Information Processing Systems, Dec. 2017, 15 pages.
Winkens et al., "Contrastive Training for Improved Out-of-Distribution Detection," Machine Learning, Jul. 2020, 18 pages.
Zagoruyko et al., "Wide Residual Networks," Proceedings of the British Machine Vision Conference, Jun. 2017, 15 pages.
Chan et al., "Entropy Maximization and Meta Classification for Out-of-Distribution Detection in Semantic Segmentation," Proceedings of the IEEE/CVF International Conference on Computer Vision, Dec. 2020, 10 pages.
Popescu et al., "Distributional Gaussian Process Layers for Outlier Detection in Image Segmentation," Information Processing in Medical Imaging: 27th International Conference, Apr. 2021, 10 pages.
Saito et al., "OpenMatch: Open-set Consistency Regularization for Semi-supervised Learning with Outliers," 35th Conference on Neural Information Processing Systems, May 2021, 12 pages.
Smith et al., "Memory-Efficient Semi-Supervised Continual Learning: The World is its Own Replay Buffer," International Joint Conference on Neural Networks, May 2021, 18 pages.

* cited by examiner

DISENTANGLED OUT-OF-DISTRIBUTION (OOD) CALIBRATION AND DATA DETECTION

CROSS-REFERENCE TO RELATED APPLICATION AND PRIORITY CLAIM

This application claims priority under 35 U.S.C. § 119(e) to U.S. Provisional Patent Application No. 63/251,463 filed on Oct. 1, 2021. This provisional application is hereby incorporated by reference in its entirety.

TECHNICAL FIELD

This disclosure relates generally to machine learning systems. More specifically, this disclosure relates to disentangled out-of-distribution (OOD) calibration and data detection.

BACKGROUND

Machine learning models, such as deep neural networks, are being used to perform more and more functions in electronic devices. In many cases, a machine learning model is developed in a well-controlled environment with a closed-world assumption. For example, a machine learning model can be optimized on a set of training data through empirical risk minimization (ERM). The resulting trained machine learning model often performs very well on test data from the same distribution as the training data.

SUMMARY

This disclosure relates to disentangled out-of-distribution (OOD) calibration and data detection.

In a first embodiment, a method includes providing, using at least one processing device of an electronic device, input data to a machine learning model. The method also includes extracting, using the at least one processing device, features of the input data. The method further includes performing, using the at least one processing device, a geometric transformation of the features, where the geometric transformation is based on first and second parametric instance-dependent scalar functions. In addition, the method includes producing, using the at least one processing device, a predictive probability distribution based on the transformed features.

In a second embodiment, an apparatus includes at least one processing device configured to provide input data to a machine learning model and extract features of the input data. The at least one processing device is also configured to perform a geometric transformation of the features, where the geometric transformation is based on first and second parametric instance-dependent scalar functions. In addition, the at least one processing device is configured to produce a predictive probability distribution based on the transformed features.

In a third embodiment, a non-transitory computer readable medium contains instructions that when executed cause at least one processor to provide input data to a machine learning model and extract features of the input data. The non-transitory computer readable medium also contains instructions that when executed cause the at least one processor to perform a geometric transformation of the features, where the geometric transformation is based on first and second parametric instance-dependent scalar functions. The non-transitory computer readable medium further contains instructions that when executed cause the at least one processor to produce a predictive probability distribution based on the transformed features.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

Figure 1:
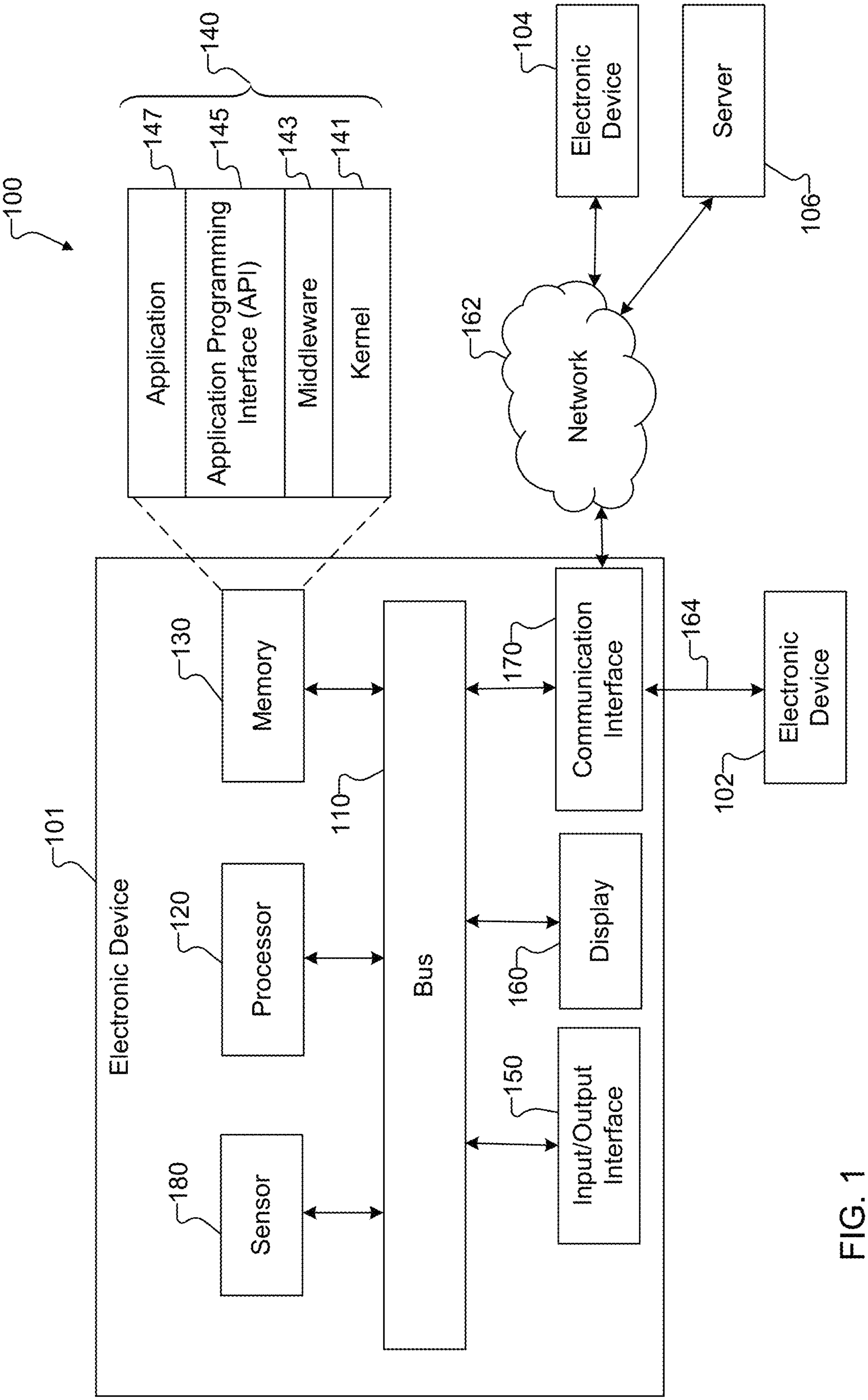
FIG. 1 illustrates an example network configuration including an electronic device in accordance with this disclosure.

FIGS. 1 through 7, discussed below, and the various embodiments of this disclosure are described with reference to the accompanying drawings. However, it should be appreciated that this disclosure is not limited to these embodiments, and all changes and/or equivalents or replacements thereto also belong to the scope of this disclosure. The same or similar reference denotations may be used to refer to the same or similar elements throughout the specification and the drawings.

As noted above, machine learning models, such as deep neural networks, are being used to perform more and more functions in electronic devices. In many cases, a machine learning model is developed in a well-controlled environment with a closed-world assumption. For example, a machine learning model can be optimized on a set of training data through empirical risk minimization (ERM). The resulting trained machine learning model often performs very well on test data from the same distribution as the training data.

Unfortunately, once a trained machine learning model is deployed in the real world, the machine learning model will inevitably encounter out-of-distribution (OOD) data, which refers to data of a type not seen during training. Out-of-distribution data can routinely cause a trained machine learning model to fail, such as when the trained machine learning model fails to produce reliable predictions. This can be problematic in safety-critical applications like self-driving vehicles (such as when models are used to detect people or objects in front of vehicles) and medical imaging analysis (such as when models are used to detect tumors in patients). This can also be problematic in non-safety-critical applications, such as open-set and continual learning applications. In many instances, it may be useful to know when a trained machine learning model experiences out-of-distribution data.

This disclosure provides various techniques for performing disentangled out-of-distribution calibration and data detection. As described in more detail below, a geometric transformation can be designed and used in a machine learning model, such as by replacing the last linear classifier in a neural network or other layer of another machine learning model. The geometric transformation introduces two parametric instance-dependent scalar functions into the linear classification layer or other layer of the machine learning model. These two parametric instance-dependent scalar functions can be trained and used to help improve the sensitivity of the machine learning model. Also, a scoring function can be used to generate scores or other indicators that input data is out-of-distribution. For instance, the scoring function may be used to characterize the spectrum of OOD data in terms of covariate shift and concept shift, which can help to better detect OOD data in different categories. As a result, it is possible for the machine learning model to have improved sensitivity to out-of-distribution data and to identify when input data is out-of-distribution. Moreover, the scoring function can be designed to scale with the possibility of data being out-of-distribution, which enables clearer identification of out-of-distribution conditions. In addition, one or more parameters of the geometric transformation can be calibrated to better align output probabilities generated by the machine learning model with the actual performance of the machine learning model. Among other things, this can help to provide more intuitive and reliable interpretation of the output probabilities by users.

FIG. 1 illustrates an example network configuration 100 including an electronic device in accordance with this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, or a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more of a central processing unit (CPU), an application processor (AP), or a communication processor (CP). The processor 120 is able to perform control on at least one of the other components of the electronic device 101 and/or perform an operation or data processing relating to communication. In some embodiments, the processor 120 can be a graphics processor unit (GPU). As described below, the processor 120 may be used to generate or use a machine learning model that is being trained/calibrated or has been trained/calibrated to support disentangled OOD data detection.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 includes one or more applications related to generating or using a machine learning model that is being trained/calibrated or has been trained/calibrated to support disentangled OOD data detection. These functions can be performed by a single application or by multiple applications that each carries out one or more of these functions.

The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals, such as images.

The electronic device 101 further includes one or more sensors 180 that can meter a physical quantity or detect an activation state of the electronic device 101 and convert metered or detected information into an electrical signal. For example, one or more sensors 180 may include one or more cameras or other imaging sensors, which may be used to capture images of scenes. The sensor(s) 180 can also include one or more buttons for touch input, one or more microphones, a gesture sensor, a gyroscope or gyro sensor, an air pressure sensor, a magnetic sensor or magnetometer, an acceleration sensor or accelerometer, a grip sensor, a proximity sensor, a color sensor (such as an RGB sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

The first external electronic device 102 or the second external electronic device 104 can be a wearable device or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, that include one or more cameras.

The wireless communication is able to use at least one of, for example, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include, for example, at least one of a universal serial bus (USB), high definition multimedia interface (HDMI), recommended standard 232 (RS-232), or plain old telephone service (POTS). The network 162 includes at least one communication network, such as a computer network (like a local area network (LAN) or wide area network (WAN)), Internet, or a telephone network.

The first and second external electronic devices 102 and 104 and server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162, the electronic device 101 may be independently operated without a separate communication function according to some embodiments of this disclosure.

The server 106 can include the same or similar components as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. As described below, the server 106 may be used to generate or use a machine learning model that is being trained/calibrated or has been trained/calibrated to support disentangled OOD data detection.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
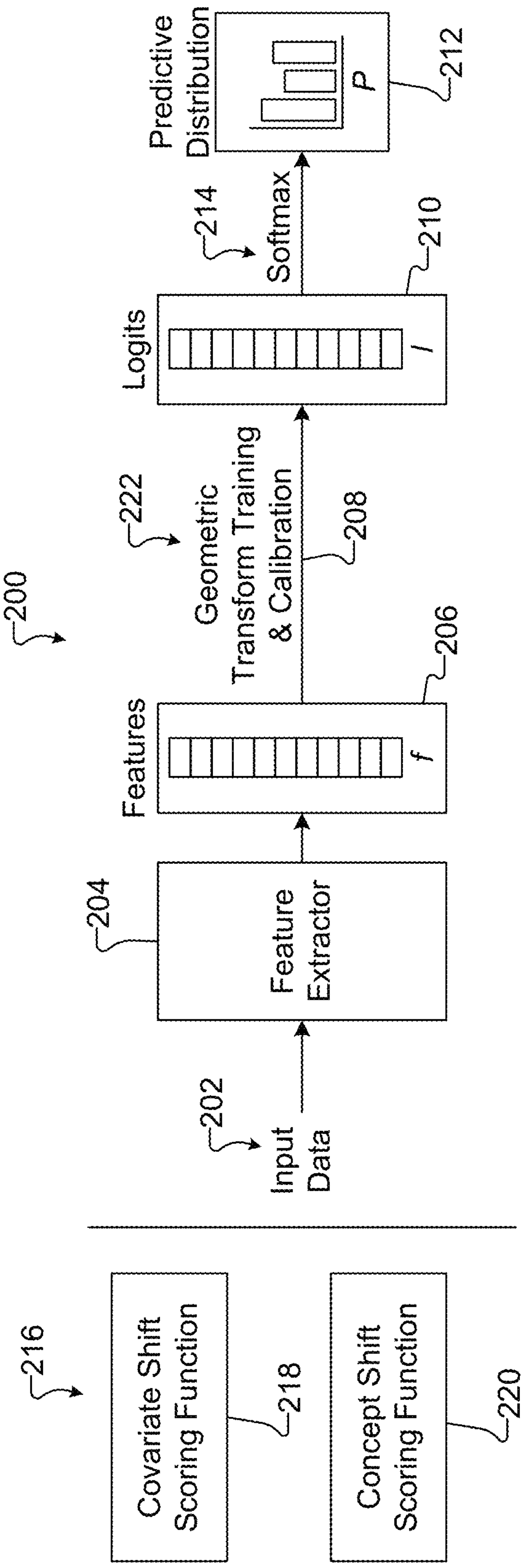
FIG. 2 illustrates an example architecture for disentangled out-of-distribution (OOD) calibration and data detection in accordance with this disclosure.

FIG. 2 illustrates an example architecture 200 for disentangled OOD calibration and data detection in accordance with this disclosure. For ease of explanation, the architecture 200 is described as being implemented or supported by the electronic device 101, server 106, or other device(s) in the network configuration 100 of FIG. 1. However, the architecture 200 may be implemented or supported by any other suitable device(s) and in any other suitable system(s).

As shown in FIG. 2, the architecture 200 generally defines the structure of a machine learning model, such as a neural network or other type of machine learning model. In this example, the machine learning model is configured to receive and process input data 202. The input data 202 can include any suitable information to be processed by a machine learning model. In some embodiments, the input data 202 may represent image data, audio data, text data, or any other suitable information. The input data 202 may also be obtained from any suitable source(s), such as from one or more imaging sensors 180 of the electronic device 101 or other component(s) of the electronic device 101. Note that the input data 202 here may or may not be obtained by the same device that is implementing or using the machine learning model.

The input data 202 is provided to a feature extractor 204, which processes the input data 202 in order to identify a set of features ($f$) 206 associated with the input data 202. The features 206 generally represents aspects or characteristics of the input data 202 that are extracted from the input data 202 or generated using the input data 202. Typically, the feature extractor 204 is implemented using one or more convolution layers or other layers of a machine learning model, where the machine learning model learns during training which aspects or characteristics of the input data 202 are useful or relevant in performing a specific task. The feature extractor 204 can use any suitable technique to identify features 206 associated with input data 202. Various approaches for implementing feature extractors have been developed, and additional approaches are sure to be developed in the future.

The features 206 are subjected to a geometric transformation 208, which converts the features 206 into logits (l) 210. The logits 210 represent unnormalized predictions generated by the machine learning model. For example, assume that the machine learning model is trained to perform image classification, meaning the machine learning model processes images and attempts to identify the contents of the images. This may be done by training the machine learning model to generate probabilities that a specific image contains image content in different classes of content. One simple example of this is a machine learning model trained to identify whether images contain cats or dogs. The logits 210 can represent the unnormalized predictions generated by the machine learning model (based on the extracted features 206) that images contain cats or dogs. A logit 210 with a higher value can indicate a higher likelihood that input data 202 falls within a particular class, and a logit 210 with a lower value can indicate a smaller likelihood that the input data 202 falls within the particular class.

Since the values of the logits 210 can vary when processing different input data 202 (even when the logits 210 indicate the same classifications), a normalization process can occur in order to convert the logits 210 into predictive probability distributions (P) 212. Each predictive probability distribution 212 can represent (using probabilities with a normalized scale) the likelihood that the input data 202 falls within each of multiple classes. Thus, for example, a predictive probability distribution 212 may indicate that there is a 95% probability that an image contains a cat and a 15% probability that the image contains a dog. Each predictive probability distribution 212 may therefore represent the final prediction generated by the machine learning model for particular input data 202. Note that this is one example of the meanings of the outputs generated by the machine learning model and that the machine learning model may be trained to produce any other suitable types of outputs.

In some embodiments, the logits 210 can be converted into the predictive probability distributions 212 using a softmax function 214, which generally operates to convert a vector of N numbers (the logits 210) into a probability distribution having N different potential outcomes. As a particular example, a set of logits 210 can be converted into a predictive probability distribution 212 in the following manner. Let $l_i=\langle f, w_i\rangle=\|f\|_2 \cos \phi_i$ represent the $i^{th}$ logit 210 in a set of logits 210. Here, $f$ represents the features 206, and $w_i$ represents the $i^{th}$ possible class into which the features 206 can be mapped. Also, $\|f\|_2$ represents the norm of the feature vector formed by the features 206, and $\cos \phi_i$ represents the cosine similarity between this feature vector and a vector associated with the $i^{th}$ possible class $w_i$. The probability distribution 212 for the set of logits 210 expressed in this manner can be determined as follows.

$$P_i = \frac{e^{l_i}}{\Sigma_j^M e^{l_j}}$$

Here, M represents the total number of logits 210. Effectively, the architecture 200 in this example operates by mapping input data 202 into feature vectors containing features 206 and mapping the feature vectors to discrete predictive probability distributions 212 over a set of possible outcomes.

In typical neural networks and other machine learning models, a linear transformation is performed to convert features into logits. This approach is generally effective when the input data 202 is within the distribution of the training data that was used to train the machine learning model. However, when the input data 202 goes out-of-distribution, the machine learning model struggles to produce accurate results. To help remedy this, as shown in FIG. 2, the geometric transformation 208 converts the features 206 into the logits 210. The geometric transformation 208 converts the features 206 into the logits 210 in a nonlinear manner to help improve the sensitivity of the machine learning model.

In some embodiments, the geometric transformation 208 includes two parametric instance-dependent scalar functions. These two scalar functions are denoted α(ƒ) and β(ƒ) in the following discussion. These scalar functions α(ƒ) and β(ƒ) represent intra order-preserving functions, where 0<α(ƒ)<1 and β(ƒ)>1. In some cases, the numerical constraint on α(ƒ) can be enforced using a sigmoid activation, and the numerical constraint on β(ƒ) can be enforced using a softplus constraint. In particular embodiments, the geometric transformation 208 may be expressed as follows.

$$l_i = \left(\frac{1}{\alpha(f)}\|f\|_2 + \frac{\beta(f)}{\alpha(f)}\right)\|w_i\|_2 \cos\phi_i \tag{1}$$

Here, $l_i$ represents the $i^{th}$ logit 210. Using this definition of the logits 210, the predictive probability distribution 212 for a set of logits 210 can be determined as follows.

$$P(Y = i|x) = \frac{e^{l_i}}{\sum_{j=1}^{M} e^{l_j}} = \frac{e^{\left(\left(\frac{1}{\alpha(f)}\|f\|_2 + \frac{\beta(f)}{\alpha(f)}\|w_i\|_2 \cos\phi_i\right)\right)}}{\sum_{j=1}^{M} e^{\left(\left(\frac{1}{\alpha(f)}\|f\|_2 + \frac{\beta(f)}{\alpha(f)}\|w_j\|_2 \cos\phi_j\right)\right)}} \tag{2}$$

The two scalar functions α(ƒ) and β(ƒ) can be adjusted during training of the machine learning model so that the machine learning model processes input data and generates desired output predictions (at least to within some acceptable degree of accuracy). This geometric transformation 208 can replace the last linear classifier in a typical neural network or other machine learning model and improves the sensitivity of the machine learning model.

A scoring function 216 is also used here to characterize the spectrum of out-of-distribution data that might be received by the machine learning model. The scoring function 216 is generally used to distinguish out-of-distribution data from in-distribution data. For example, the scoring function 216 can generate a score for each collection of input data 202 being processed, where the score indicates whether that input data 202 represents in-distribution data or out-of-distribution data. As a particular example, higher scores produced by the scoring function 216 may represent higher likelihoods of the input data 202 being out-of-distribution.

In this example, the scoring function 216 can represent a combination of scores generated by a covariate shift scoring function 218 and a concept shift scoring function 220. A covariate shift generally refers to a change in the style of input data 202 being received (compared to the training data used to train the machine learning model). A concept shift generally refers to a change in the semantics of input data 202 being received (compared to the training data used to train the machine learning model). Both types of shifts can be used to characterize the spectrum of OOD data. To represent these two distribution shifts, the two scoring functions 218 and 220 can be derived, such as based on Kullback-Leibler (KL) divergence, and applied to the input data 202. The scoring function 216 may combine the scores produced by the scoring functions 218-220 in order to generate a final score representing a measure of whether input data 202 is likely in-distribution or out-of-distribution. By breaking out multiple types of shifting that can lead to data being out-of-distribution, the architecture 200 here disentangles the different types of shifting, which can lead to more-accurate OOD detection.

In some embodiments, the scoring function 216 may be expressed as follows.

$$U = \max_j l_j - \frac{1}{M}\sum_{i=1}^{M} l_i = \overbrace{\|f\|_2}^{g(x)} \underbrace{\left(\max_j \|w_j\|_2 \cos\phi_j - \frac{1}{M}\sum_{i=1}^{M}\|w_i\|_2 \cos\phi_i\right)}_{h(y,x)} \tag{3}$$

In this expression of the scoring function 216, g(x) represents the covariate shift scoring function 218, and h(y, x) represents the concept shift scoring function 220. Both of the scoring functions 218-220 can generate scalar values (scores) indicating the possibility that the input data 202 is out-of-distribution. In some cases, the scalar values can be compared to their average validation magnitudes, and thresholds can be applied to the differences between the scalar values and their average validation magnitudes in order to detect OOD input data 202. In this example, the covariate shift scoring function 218 is a function of feature norms, and the concept shift scoring function 220 is a function of feature angles. Both scoring functions 218-220 can be input-dependent scalar functions, and a single machine learning linear layer can be used to learn them in some embodiments.

As shown in FIG. 2, a training and calibration process 222 may be applied to the geometric transformation 208 prior to deployment of the machine learning model. The training portion of the process 222 can occur when the machine learning model overall is being trained, and the calibration portion of the process 222 can occur after the machine learning model has been trained. Part of the training portion of the process 222 can include adjusting (among other things) the scalar functions α(ƒ) and β(ƒ) so that the machine learning model processes training input data and generates desired output predictions, at least to within some acceptable degree of accuracy. After training of the machine learning model is completed, the geometric transformation 208 can be calibrated in order to better align the output probabilities of the machine learning model to its accuracy, which provides more intuitive and reliable interpretations of the output probabilities generated by the machine learning model. This could be referred to as confidence calibration as it aligns the probability (confidence) of a predicted class to the empirical accuracy of the prediction. In some cases, post-training calibration can occur by freezing the parameters of the feature extractor 204 (meaning its parameters cannot be changed) and modifying the geometric transformation-specific parameters (namely the scalar functions α(ƒ) and β(ƒ)). In some cases, for instance, the scalar functions α(ƒ) and β(ƒ) can be calibrated by minimizing their negative log likelihood (NLL) on a validation dataset, which helps to align the model's confidence to its accuracy.

Although FIG. 2 illustrates one example of an architecture 200 for disentangled OOD calibration and data detection, various changes may be made to FIG. 2. For example, any other or additional scoring function(s) may be used in the architecture 200. Also, any other or additional training and calibration process may be used in the architecture 200.

Figure 3:
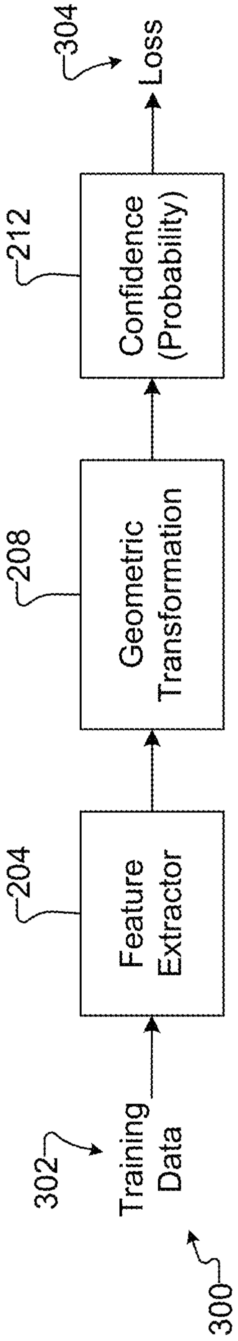
FIG. 3 illustrates an example training process to support disentangled OOD calibration and data detection in accordance with this disclosure.

FIG. 3 illustrates an example training process 300 to support disentangled OOD calibration and data detection in accordance with this disclosure. For ease of explanation, the process 300 is described as being performed by the electronic device 101, server 106, or other device(s) in the network configuration 100 of FIG. 1 in order to train a machine learning model having the architecture 200 shown in FIG. 2. As a particular example, the training may be performed by the server 106 prior to deployment of a trained and calibrated machine learning model to one or more end user devices (such as the electronic device 101). However, the process 300 may be performed by any other suitable device(s) for any other suitable machine learning model(s) and in any other suitable system(s).

As shown in FIG. 3, the training process 300 involves obtaining and using training data 302. The training data 302 may be obtained from any suitable source(s) (such as one or more public or private repositories), generated by the server 106, or otherwise obtained in any suitable manner. The training data 302 typically includes training input data to be processed by a machine learning model and known ground truths, where the training input data is provided to the machine learning model for processing and the ground truths represent the expected outputs of the machine learning model.

The outputs of the machine learning model produced using the training input data represent confidences (predictive probability distributions 212) and are provided to a loss function 304, which calculates a loss associated with the machine learning model's predictions. For example, when the outputs of the machine learning model differ from the ground truths, the differences can be used to calculate a loss as defined by the loss function 304. The loss function 304 may use any suitable measure of loss associated with outputs generated by a machine learning model, such as a cross-entropy loss or a mean-squared error.

When the loss calculated by the loss function 304 is larger than desired, the parameters of the machine learning model can be adjusted, which may include adjusting the parameters of (among other things) the feature extractor 204 and the geometric transform 208. Since part of the training process 300 can include adjusting the parameters of the geometric transform 208, this may include adjusting the scalar functions $\alpha(f)$ and $\beta(f)$. Once adjusted, the training data 302 can be provided to the adjusted machine learning model, and additional outputs from the machine learning model can be compared to the ground truths so that additional losses can be determined using the loss function 304. Ideally, over time, the machine learning model produces more accurate outputs that more closely match the ground truths, and the measured loss becomes less. At some point, the measured loss can drop below a specified threshold, at which point the training of the machine learning model can be completed.

Although FIG. 3 illustrates one example of a training process 300 to support disentangled OOD calibration and data detection, various changes may be made to FIG. 3. For example, various additional layers or components of the machine learning model can be modified during the training process 300.

Figure 4:
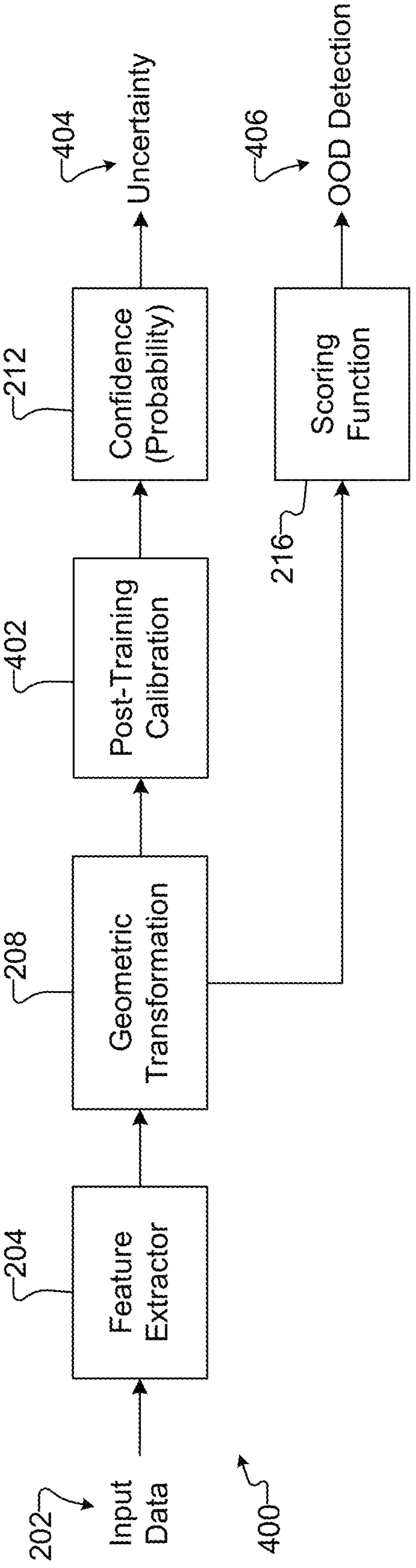
FIG. 4 illustrates an example post-training calibration and inferencing process to support disentangled OOD calibration and data detection in accordance with this disclosure.

FIG. 4 illustrates an example post-training calibration and inferencing process 400 to support disentangled OOD calibration and data detection in accordance with this disclosure. For ease of explanation, the process 400 is described as being performed by the electronic device 101, server 106, or other device(s) in the network configuration 100 of FIG. 1 in order to calibrate and use a trained machine learning model having the architecture 200 shown in FIG. 2. As a particular example, the post-training calibration may be performed by the server 106 prior to deployment of a trained and calibrated machine learning model to one or more end user devices (such as the electronic device 101), and the inferencing may be performed by the electronic device 101. However, the process 400 may be performed by any other suitable device(s) for any other suitable machine learning model(s) and in any other suitable system(s).

As shown in FIG. 4, the input data 202 is provided to the feature extractor 204 for extraction of the features of the input data 202, and the features are transformed by the geometric transformation 208. In this example, the geometric transformation 208 can undergo a post-training calibration process 402, which can adjust the geometric transformation-specific parameters (such as the scalar functions $\alpha(f)$ and $\beta(f)$) of the geometric transformation 208. For example, the scalar functions $\alpha(f)$ and $\beta(f)$ can be calibrated by minimizing their NLL on a validation dataset. This helps to align the machine learning model's confidence (probabilities) to its accuracy. Note that the post-training calibration process 402 may only need to be performed once (such as by the server 106 prior to deployment) and can be omitted during inferencing that is performed using the machine learning model after deployment.

The outputs of the geometric transformation 208 (the logits 210) are converted into confidences (the probability distributions 212) and are used to represent uncertainties 404 associated with predictions made by the machine learning model. The confidences here are calibrated confidences due to the performance of the post-training calibration process 402. The outputs of the geometric transformation 208 (the logits 210) are also provided to the scoring function 216, which generates one or more scores indicative of whether the input data 202 is in-distribution or out-of-distribution. For example, the scores generated by the scoring function 216 can be produced based on scores produced using the covariate shift scoring function 218 and the concept shift scoring function 220 (which may actually form parts of the same scoring function 216). Each score can be compared to a threshold. If the threshold is exceeded, an OOD detection 406 can be produced indicating that out-of-distribution data has been received. The OOD detection 406 can be used in any suitable manner, such as to notify a user of the electronic device 101 and ask for input.

Although FIG. 4 illustrates one example of a post-training calibration and inferencing process 400 to support disentangled OOD calibration and data detection, various changes may be made to FIG. 4. For example, as discussed above, the post-training calibration process 402 can be omitted here after the machine learning model undergoes the post-training calibration process 402, meaning the post-training calibration process 402 is not needed during inferencing.

Figure 5:
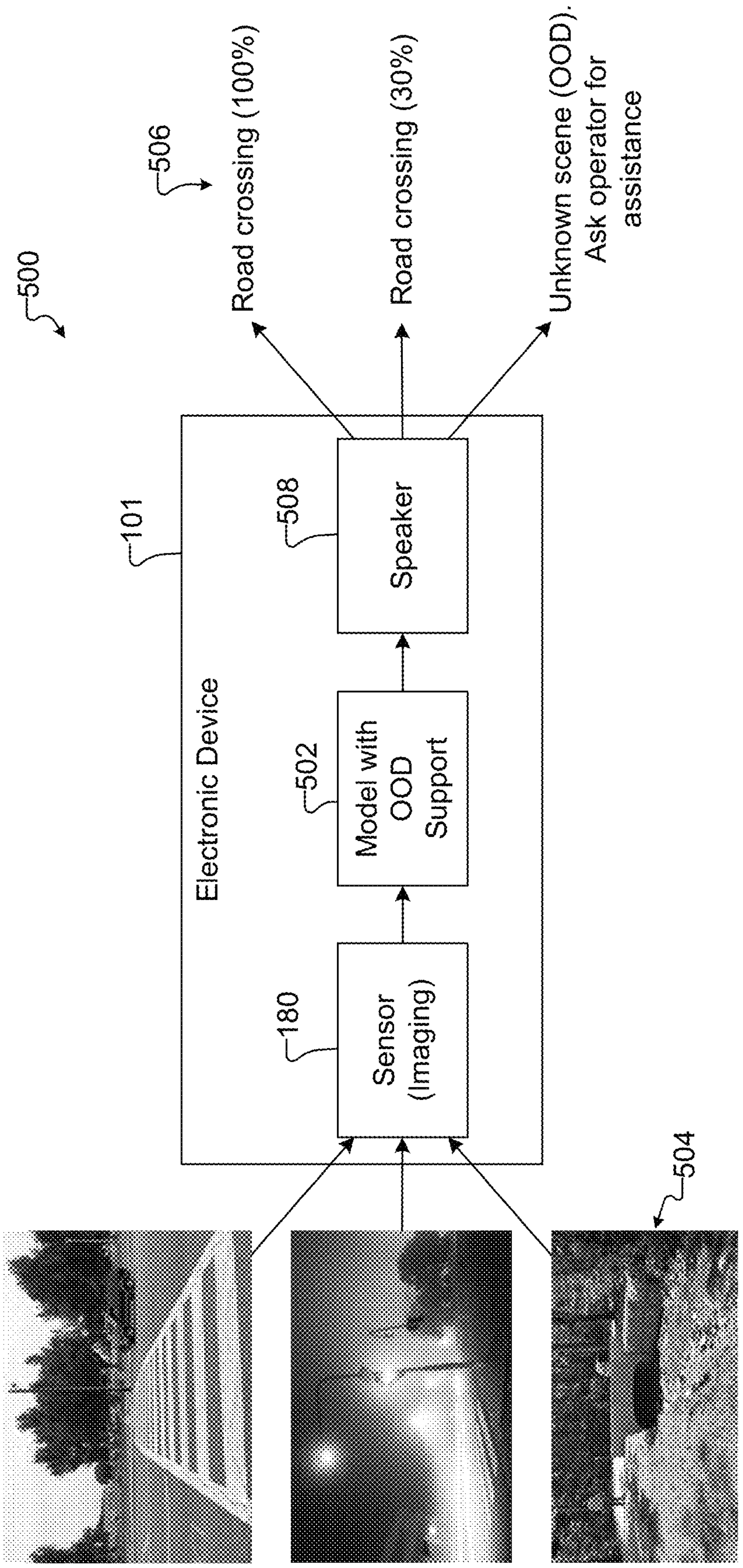
FIG. 5 illustrates an example usage of disentangled OOD calibration and data detection in accordance with this disclosure.

FIG. 5 illustrates an example usage 500 of disentangled OOD calibration and data detection in accordance with this disclosure. For ease of explanation, the usage 500 of disentangled OOD calibration and data detection is described as involving the electronic device 101 in the network configuration 100 of FIG. 1 with a machine learning model having the architecture 200 shown in FIG. 2. However, disentangled OOD calibration and data detection may be used by any other suitable device(s) with any other suitable machine learning model(s) and in any other suitable system(s).

As shown in FIG. 5, the electronic device 101 here includes or has access to a machine learning model 502. The machine learning model 502 may have the architecture 200 shown in FIG. 2 and may be trained and calibrated based on the processes 300 and 400 shown in FIGS. 3 and 4. In this example, the machine learning model 502 has been trained to perform image classification, which means that the machine learning model 502 can receive input data in the form of images 504 and generate outputs 506 identifying the estimated contents of the images 504. The images 504 may, for example, represent images captured using one or more sensors 180 of the electronic device 101.

Due to the training and calibration of the machine learning model 502 as discussed above, the machine learning model 502 is able to generate outputs 506 containing (i) estimated classifications of image contents and (ii) estimated probabilities that the classifications are correct. This is because, as discussed above, the calibration helps to better align the output probabilities of the machine learning model 502 to its accuracy. Thus, in this example, the machine learning model 502 could estimate that the top image 504 contains a road crossing with very high accuracy, where the confidence score is based on a prediction that is more aligned with the actual accuracy of the machine learning model 502 (so the prediction is not over-confident). The machine learning model 502 could estimate that the middle image 504 contains a road crossing with low accuracy, which can be due to the image 504 containing a road crossing in foggy weather (which makes road crossing markings harder to visually identify). The machine learning model 502 could estimate that the bottom image 504 contains image data that is out-of-distribution, such as when the image 504 contains a bridge. In this last case, a classification app or other logic may ask a user for input or take other suitable corrective action(s).

The outputs 506 of the machine learning model 502 can be used in any suitable manner. In this particular example, the outputs 506 are presented audibly to one or more users via at least one speaker 508. However, the outputs 506 may be used in other ways, such as when the outputs 506 are presented on the display 160 of the electronic device 101 or further processed. For instance, the outputs 506 may be processed by other logic (possibly one or more other machine learning models) to perform one or more additional functions. As a particular example, when used in a self-driving vehicle, the outputs 506 may represent determined classifications of people or objects in front of or around a vehicle, and the outputs 506 may be used by one or more other machine learning models or other logic to control operation of the vehicle.

Although FIG. 5 illustrates one example of a usage 500 of disentangled OOD calibration and data detection, various changes may be made to FIG. 5. For example, an electronic device 101 or other device may include any suitable number of machine learning models designed in accordance with this disclosure. Also, each machine learning model may be used to process any suitable input data and produce any suitable results.

It should be noted that the functions shown in or described with respect to FIGS. 2 through 5 can be implemented in an electronic device 101, server 106, or other device(s) in any suitable manner. For example, in some embodiments, at least some of the functions shown in or described with respect to FIGS. 2 through 5 can be implemented or supported using one or more software applications or other software instructions that are executed by the processor(s) 120 of the electronic device 101, server 106, and/or other device(s). In other embodiments, at least some of the functions shown in or described with respect to FIGS. 2 through 5 can be implemented or supported using dedicated hardware components. In general, the functions shown in or described with respect to FIGS. 2 through 5 can be performed using any suitable hardware or any suitable combination of hardware and software/firmware instructions. Also, the functions shown in or described with respect to FIGS. 2 through 5 can be performed by a single device or by multiple devices.

Figure 6:
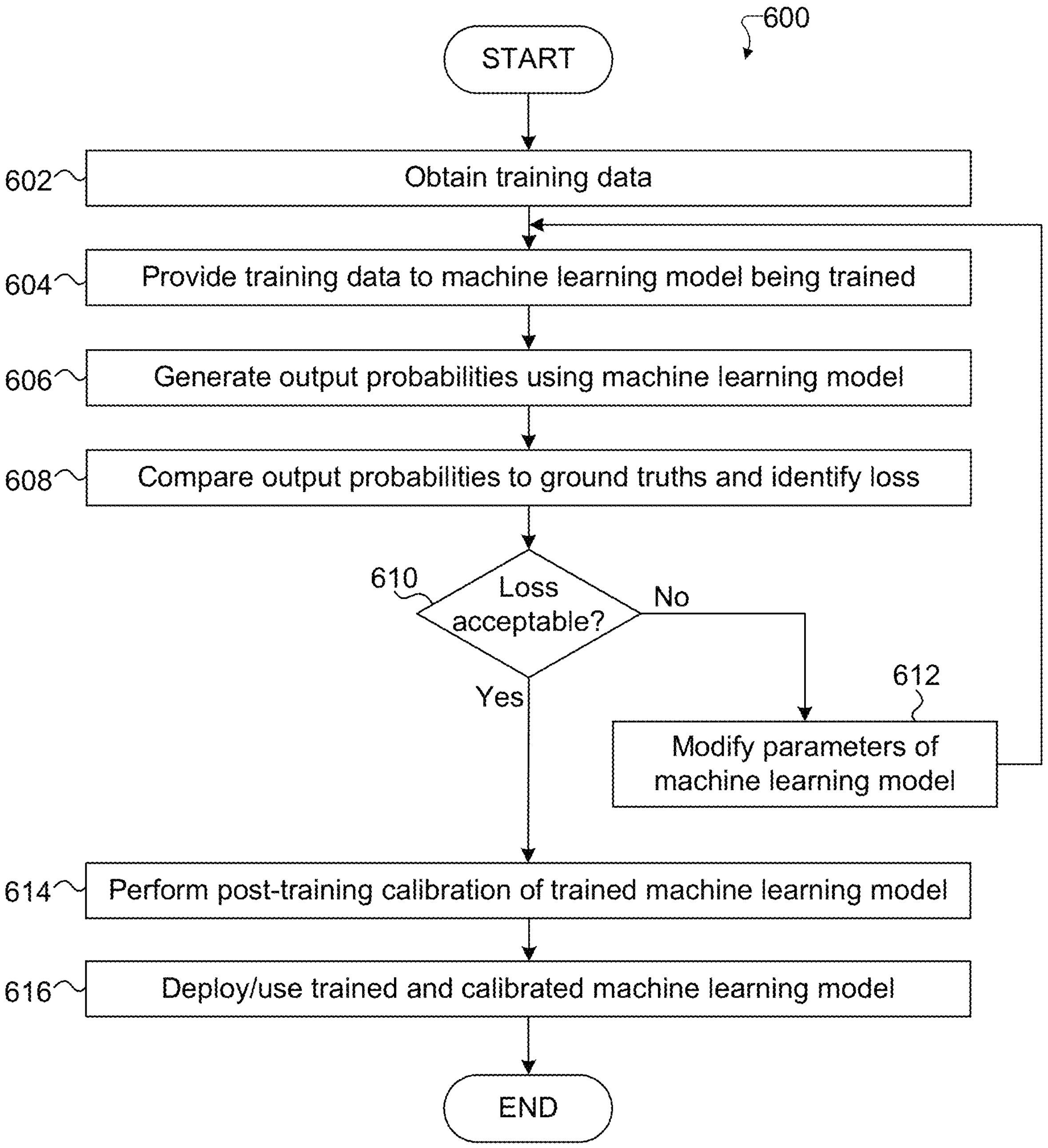
FIG. 6 illustrates an example method for training and calibrating a machine learning model to perform disentangled OOD data detection in accordance with this disclosure.

FIG. 6 illustrates an example method 600 for training and calibrating a machine learning model to perform disentangled OOD data detection in accordance with this disclosure. For ease of explanation, the method 600 is described as being performed by the server 106 in the network configuration 100 of FIG. 1. However, the method 600 may be performed by any other suitable device(s), such as the electronic device 101, and in any other suitable system(s).

As shown in FIG. 6, training data for use in training a machine learning model is obtained at step 602. This may include, for example, the processor 120 of the server 106 obtaining the training data 302 from any suitable source(s), such as when retrieved from one or more public or private repositories or generated by the server 106. The training data is provided to a machine learning model being trained at step 604. This may include, for example, the processor 120 of the server 106 providing at least some of the training data 302 to a machine learning model having the architecture 200 shown in FIG. 2. Output probabilities are generated using the machine learning model based on the training data at step 606. This may include, for example, the processor 120 of the server 106 processing the training data 302 using the feature extractor 204 and geometric transformation 208. This may also include the processor 120 of the server 106 converting the resulting logits 210 into predictive probability distributions 212, such as by using the softmax function 214.

The output probabilities are compared to ground truths within or associated with the training data to identify a loss associated with the machine learning model at step 608. This may include, for example, the processor 120 of the server 106 determining a cross-entropy loss, a mean-squared error, or other measure of loss associated with the predictive probability distributions 212. A determination is made whether the loss is acceptable at step 610. This may include, for example, the processor 120 of the server 106 comparing the determined loss to a threshold. If the loss is not acceptable, one or more parameters of the machine learning model can be adjusted at step 612. This may include, for example, the processor 120 of the server 106 adjusting various parameters of the feature extractor 204, geometric transformation 208, or other layer(s) or component(s) of the machine learning model. As a particular example, this may include the processor 120 of the server 106 adjusting one or more of the scalar functions $\alpha(f)$ and $\beta(f)$ of the geometric transformation 208. The process returns to step 604 in order to process training data using the adjusted machine learning model and determine an additional loss for the adjusted machine learning model.

At some point, the machine learning model ideally obtains a suitably-low loss value that is deemed acceptable at step 610, and post-training calibration of the trained machine learning model occurs at step 614. This may include, for example, the processor 120 of the server 106 freezing the parameters of the feature extractor 204 and modifying transformation-specific parameters of the geometric transformation, such as the scalar functions $\alpha(f)$ and $\beta(f)$. In some cases, the scalar functions $\alpha(f)$ and $\beta(f)$ can be calibrated by minimizing their NLL on a validation dataset. The trained and calibrated machine learning model is deployed or used at step 616. This may include, for example, the processor 120 of the server 106 sending the trained and calibrated machine learning model to one or more other devices, such as one or more end user devices (like the electronic device 101), for use. Also or alternatively, the trained and calibrated machine learning model may be used by the server 106.

Although FIG. 6 illustrates one example of a method 600 for training and calibrating a machine learning model to perform disentangled OOD data detection, various changes may be made to FIG. 6. For example, while shown as a series of steps, various steps in FIG. 6 may overlap, occur in parallel, occur in a different order, or occur any number of times.

Figure 7:
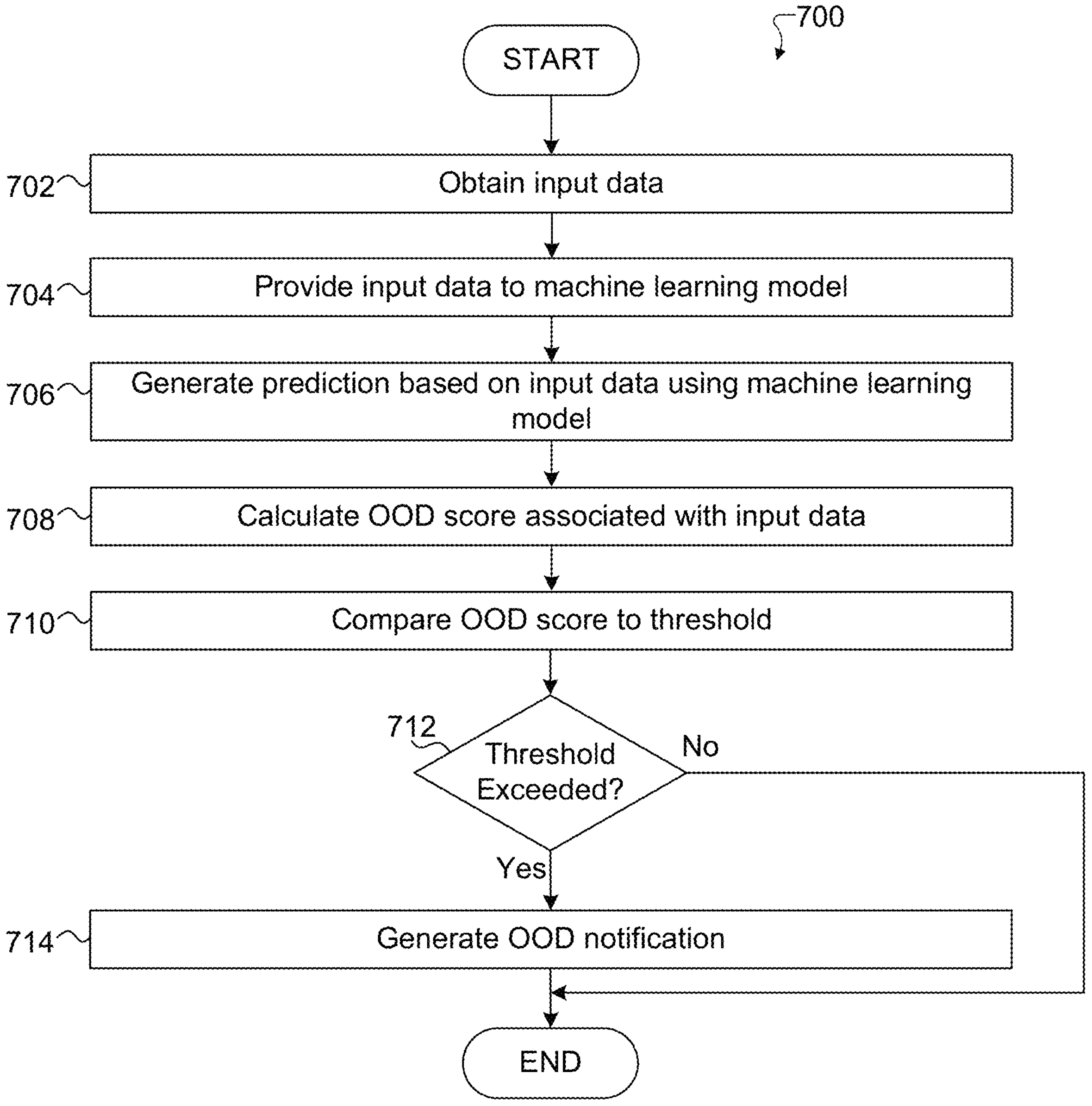
FIG. 7 illustrates an example method for using a machine learning model trained and calibrated to perform disentangled OOD data detection in accordance with this disclosure.

FIG. 7 illustrates an example method 700 for using a machine learning model trained and calibrated to perform disentangled OOD data detection in accordance with this disclosure. For ease of explanation, the method 700 is described as being performed by the electronic device 101 in the network configuration 100 of FIG. 1. However, the method 700 may be performed by any other suitable device(s), such as the server 106, and in any other suitable system(s).

As shown in FIG. 7, input data is obtained at step 702. This may include, for example, the processor 120 of the electronic device 101 obtaining the input data 202 from any suitable source(s), such as one or more other components of the electronic device 101. The input data 202 may take any suitable form depending on the machine learning model used by the electronic device 101 and the function being performed by the electronic device 101. In some cases, for instance, the input data 202 may include one or more images captured by at least one camera or other imaging sensor(s) 180, audio data generated by at least one microphone or other audio sensor(s) 180, or text data contained in one or more emails or text messages. In general, the input data 202 can vary widely depending on the application.

The input data is provided to at least one machine learning model at step 704. This may include, for example, the processor 120 of the electronic device 101 providing the input data to a machine learning model 502, which can have the architecture 200 shown in FIG. 2 and may be trained using the method 600 shown in FIG. 6. At least one prediction is generated based on the input data using the machine learning model(s) at step 706. This may include, for example, the processor 120 of the electronic device 101 using the one or more machine learning models to generate one or more predictive probability distributions 212 associated with the input data 202. Any suitable predictions may be generated here, such as one or more classifications of the input data 202 into one or more of multiple classes.

An OOD score associated with the input data is calculated at step 708. This may include, for example, the processor 120 of the electronic device 101 performing the scoring function 216 (based on the scoring functions 218-220) using the outputs of the geometric transformation 208 in order to identify an OOD score associated with the input data 202. The OOD score is compared to a threshold at step 710, and a determination is made whether the OOD score exceeds the threshold at step 712. This may include, for example, the processor 120 of the electronic device 101 comparing the OOD score to a value above which is indicative of OOD data. If the threshold is exceeded, an OOD notification is generated at step 714. This may include, for example, the processor 120 of the electronic device 101 generating a notification for a user. If the threshold is not exceeded, an OOD condition is not detected, and the one or more predictive probability distributions 212 produced by the machine learning model may be used in any suitable manner (such as when provided to a user or provided to another machine learning model or other logic for further processing).

Although FIG. 7 illustrates one example of a method 700 for using a machine learning model trained and calibrated to perform disentangled OOD data detection, various changes may be made to FIG. 7. For example, while shown as a series of steps, various steps in FIG. 7 may overlap, occur in parallel, occur in a different order, or occur any number of times.

Although this disclosure has been described with reference to various example embodiments, various changes and modifications may be suggested to one skilled in the art. It is intended that this disclosure encompass such changes and modifications as fall within the scope of the appended claims.

What is claimed is:

1. A method comprising:

providing, using at least one processing device of an electronic device, input data to a machine learning model to classify contents of the input data, the machine learning model including:

a feature extractor that includes at least one convolution layer; and a geometric transformation based on first and second parametric instance-dependent scalar functions;

wherein:

the first parametric instance-dependent scalar function is represented by $\alpha(f)$ and is a function of feature norms, a numerical constraint on $\alpha(f)$ defined as $0<\alpha(f)<1$;

the second parametric instance-dependent scalar function is represented by $\beta(f)$ and is a function of feature angles, a numerical constraint on $\beta(f)$ defined as $\beta(f)>1$; and $f$ represents features of the input data;

extracting, by the at least one processing device, the features using the at least one convolution layer of the feature extractor;

performing, by the at least one processing device, a transformation of the features using the geometric transformation;

producing, by the at least one processing device, a predictive probability distribution based on the transformed features;

generating, by the at least one processing device, a score using a scoring function, the score identifying a likelihood of the input data being out-of-distribution compared to a distribution of training data used to train the machine learning model;

determining, by the at least one processing device, whether the score exceeds a threshold;

in response to the score failing to exceed the threshold, classifying, by the at least one processing device, the input data based on the predictive probability distribution; and in response to the score exceeding the threshold:

generating, by the electronic device, a user notification asking a user of the electronic device for user input;

receiving, by the electronic device, the user input; and classifying, using the at least one processing device, the input data based on the user input.

2. The method of claim 1, wherein:

the numerical constraint on $\alpha(f)$ is enforced using a sigmoid activation; and the numerical constraint on $\beta(f)$ is enforced using a softplus constraint.

3. The method of claim 1, wherein the geometric transformation is defined as:

$$l_i = \left(\frac{1}{\alpha(f)}\|f\|_2 + \frac{\beta(f)}{\alpha(f)}\right)\|w_i\|_2 \cos\phi_i$$

where:

$l_i$ represents a logit corresponding to the $i^{th}$ feature;

$f$ represents the features;

$\|f\|_2$ represents a norm of a feature vector formed by the features;

$w_i$ represents an $i^{th}$ possible class into which the features may be mapped; and $\cos\phi_i$ represents a cosine similarity associated with the feature vector and a vector associated with the $i^{th}$ possible class.

4. The method of claim 1, wherein the scoring function is based on (i) a covariate shift of the input data relative to the training data and (ii) a concept shift of the input data relative to the training data.

5. The method of claim 1, wherein the parametric instance-dependent scalar functions of the geometric transformation are calibrated such that the predictive probability distribution is aligned with an accuracy of the machine learning model.

6. The method of claim 1, further comprising:

training the machine learning model by:

obtaining, using the at least one processing device, training data; and training the machine learning model using the training data;

wherein training the machine learning model comprises:

adjusting parameters of the feature extractor in order to extract the features of the input data; and adjusting the first and second parametric instance-dependent scalar functions of the geometric transformation in order to transform the features of the input data.

7. An apparatus comprising:

at least one processing device configured to:

provide input data to a machine learning model to classify contents of the input data, the machine learning model including:

a feature extractor that includes at least one convolution layer; and a geometric transformation based on first and second parametric instance-dependent scalar functions;

wherein the first parametric instance-dependent scalar function is represented by $\alpha(f)$ and is a function of feature norms, a numerical constraint on $\alpha(f)$ defined as $0<\alpha(f)<1$;

wherein the second parametric instance-dependent scalar function is represented by $\beta(f)$ and is a function of feature angles, a numerical constraint on $\beta(f)$ defined as $\beta(f)>1$; and wherein $f$ represents features of the input data;

extract the features using the at least one convolution layer of the feature extractor;

perform a transformation of the features using the geometric transformation;

produce a predictive probability distribution based on the transformed features;

generate a score using a scoring function, the score identifying a likelihood of the input data being out-of-distribution compared to a distribution of training data used to train the machine learning model;

determine whether the score exceeds a threshold;

in response to the score failing to exceed the threshold, classify the input data based on the predictive probability distribution; and in response to the score exceeding the threshold:

generate a user notification asking a user of the apparatus for user input;

receive the user input; and classify the input data based on the user input.

8. The apparatus of claim 7, wherein:

the numerical constraint on $\alpha(f)$ is enforced using a sigmoid activation; and the numerical constraint on $\beta(f)$ is enforced using a softplus constraint.

9. The apparatus of claim 7, wherein the geometric transformation is defined as:

$$l_i = \left(\frac{1}{\alpha(f)}\|f\|_2 + \frac{\beta(f)}{\alpha(f)}\right)\|w_i\|_2 \cos\phi_i$$

where:

$l_i$ represents a logit corresponding to the $i^{th}$ feature;

$f$ represents the features;

$\|f\|_2$ represents a norm of a feature vector formed by the features;

$w_i$ represents an $i^{th}$ possible class into which the features may be mapped; and $\cos\phi_i$ represents a cosine similarity associated with the feature vector and a vector associated with the $i^{th}$ possible class.

10. The apparatus of claim 7, wherein the scoring function is based on (i) a covariate shift of the input data relative to the training data and (ii) a concept shift of the input data relative to the training data.

11. The apparatus of claim 7, wherein the parametric instance-dependent scalar functions of the geometric transformation are calibrated such that the predictive probability distribution is aligned with an accuracy of the machine learning model.

12. The apparatus of claim 7, wherein:

the at least one processing device is further configured to train the machine learning model;

to train the machine learning model, the at least one processing device is configured to:

obtain training data; and train the machine learning model using the training data by (i) adjusting parameters of the feature extractor in order to extract the features of the input data and (ii) adjusting the first and second parametric instance-dependent scalar functions of the geometric transformation in order to transform the features of the input data.

13. A non-transitory computer readable medium containing instructions that when executed cause at least one processor to:

provide input data to a machine learning model to classify contents of the input data, the machine learning model including:

a feature extractor that includes at least one convolution layer; and a geometric transformation based on first and second parametric instance-dependent scalar functions;

wherein the first parametric instance-dependent scalar function is represented by $\alpha(f)$ and is a function of feature norms, a numerical constraint on $\alpha(f)$ defined as $0<\alpha(f)<1$;

wherein the second parametric instance-dependent scalar function is represented by $\beta(f)$ and is a function of feature angles, a numerical constraint on $\beta(f)$ defined as $\beta(f)>1$; and wherein $f$ represents features of the input data;

extract the features using the at least one convolution layer of the feature extractor;

perform a transformation of the features using the geometric transformation;

produce a predictive probability distribution based on the transformed features;

generate a score using a scoring function, the score identifying a likelihood of the input data being out-of-distribution compared to a distribution of training data used to train the machine learning model;

determine whether the score exceeds a threshold;

in response to the score failing to exceed the threshold, classify the input data based on the predictive probability distribution; and in response to the score exceeding the threshold:

generate a user notification asking a user for user input;

receive the user input; and classify the input data based on the user input.

14. The non-transitory computer readable medium of claim 13, wherein the geometric transformation is defined as:

$$l_i = \left(\frac{1}{\alpha(f)}\|f\|_2 + \frac{\beta(f)}{\alpha(f)}\right)\|w_i\|_2 \cos\phi_i$$

where:

$l_i$ represents a logit corresponding to the $i^{th}$ feature;

$f$ represents the features;

$\|f\|_2$ represents a norm of a feature vector formed by the features;

$w_i$ represents an $i^{th}$ possible class into which the features may be mapped; and $\cos\phi_i$ represents a cosine similarity associated with the feature vector and a vector associated with the $i^{th}$ possible class.

15. The non-transitory computer readable medium of claim 13, wherein the scoring function is based on (i) a covariate shift of the input data relative to the training data and (ii) a concept shift of the input data relative to the training data.

16. The method of claim 1, wherein generating the user notification comprises at least one of displaying a user prompt on a display or playing an audio alert on a speaker.

17. The apparatus of claim 7, wherein, to generate the user notification, the at least one processing device is configured to at least one of initiate display of a user prompt on a display or play an audio alert on a speaker.

18. The method of claim 1, further comprising:

modifying the first and second parametric instance-dependent scalar functions by minimizing their negative log likelihood (NLL) on a validation set.

19. The apparatus of claim 7, wherein the at least one processing device is further configured to modify the first and second parametric instance-dependent scalar functions by minimizing their negative log likelihood (NLL) on a validation set.

20. The non-transitory computer readable medium of claim 13, further containing instructions that when executed cause the at least one processor to modify the first and second parametric instance-dependent scalar functions by minimizing their negative log likelihood (NLL) on a validation set.

* * * * *